M. V. DUDLEY.
CHURN.
APPLICATION FILED MAY 25, 1909.

931,583.

Patented Aug. 17, 1909.

Witnesses
Mason B. Lawton.

Inventor
Mary V. Dudley.
By C. A. Snow & Co.
Attorneys

UNITED STATES PATENT OFFICE.

MARY V. DUDLEY, OF SHAMROCK, MISSOURI.

CHURN.

No. 931,583.  Specification of Letters Patent.  Patented Aug. 17, 1909.

Application filed May 25, 1909. Serial No. 498,261.

*To all whom it may concern:*

Be it known that I, MARY V. DUDLEY, a citizen of the United States, residing at Shamrock, in the county of Callaway and State of Missouri, have invented a new and useful Churn, of which the following is a specification.

The objects of the invention are, generally, the provision in a merchantable form of a device of the class above described which shall be inexpensive to manufacture, facile in operation, and devoid of complicated parts; specifically, the provision of a cream receptacle of novel and improved construction; of novel means for reciprocating a dasher within the cream receptacle; of novel means for restraining the cream receptacle against movement under the impulse of the dasher; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

Figure 1:
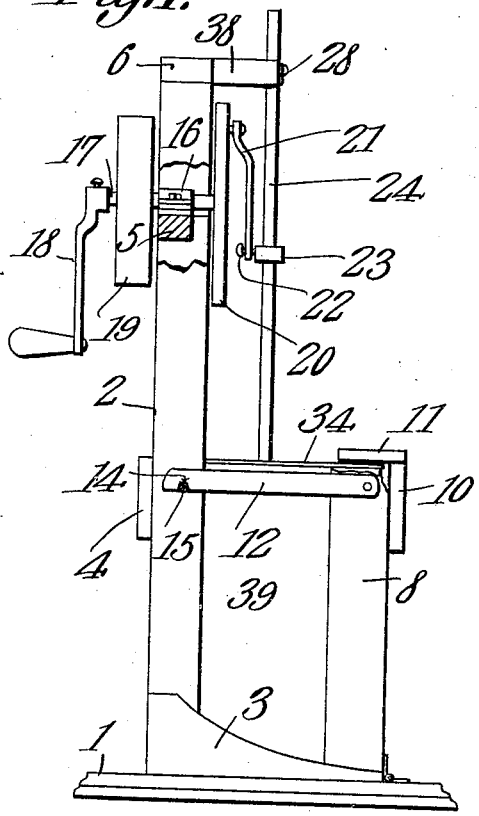
Figure 2:
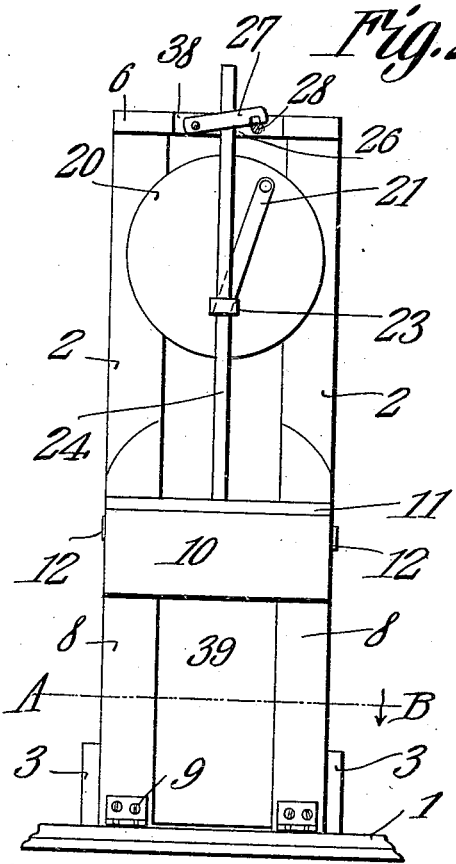
Figure 3:
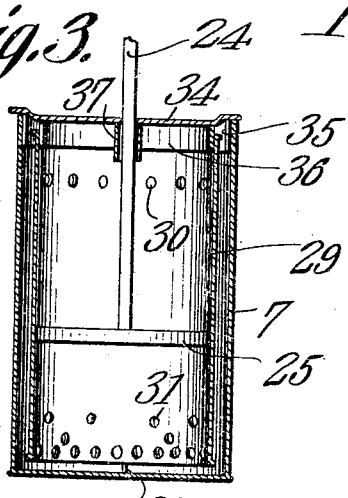
Figure 4:
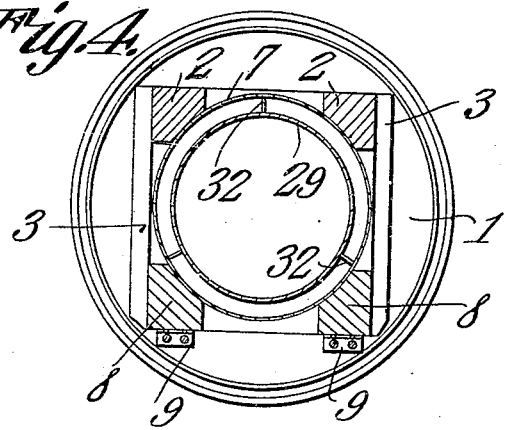

In the accompanying drawings Figures 1 and 2 are elevations of the device; Fig. 3 is a vertical longitudinal section of the cream receptacle; and Fig. 4 is a horizontal section on the line A—B of Fig. 2.

In carrying out my invention, I provide primarily a supporting member, comprising a base 1 from which rise upright, spaced standards 2 assembled with the base 1 by means of brackets 3, and with each other, intermediate their ends, by a transversely disposed cleat 4. The upper extremities of the standards 2 are united by means of a cap 6, provided with an extension 38 which projects laterally beyond the standards 2, to overhang the base 1. Intermediate the cap 6 and the cleat 4, the standards 2 are united by a transversely disposed brace 5.

Mounted upon the base 1, is the cream receptacle, denoted generally by the numeral 39. This cream receptacle 39 is adapted to be held in place by means of a clamp comprising arms 8 which are united at their lower ends with the base 1 by means of hinges 9. Adjacent their upper ends, the arms 8 are united upon their outer faces by means of a plate 10, a stop 11, arranged to overhang the cream receptacle 39 being mounted upon the upper ends of the arms 8, and upon the upper edge of the plate 10. Each of the arms 8 is provided upon its outer face with a latch 12, the same constituting a means whereby the arms may be locked to the standards 2 to hold the cream receptacle 39 in position. The latches 12 are pivotally assembled at one end with the arms 9 and at their other ends are notched as denoted by the numeral 14, to engage outstanding pintles 15 protruding from opposite faces of the standards 2.

The transverse brace 5 carries upon its upper face a bearing 16 in which is journaled for rotation a shaft 17, provided with a removable crank 18, whereby the device may be operated manually, and with a belt pulley 19, whereby the device may be operated from a power shaft. The shaft 17 is provided with a head 20 which is operatively connected with a pitman 21, the lower end of the pitman 21 being apertured to receive a screw 22, which, passing through the lower extremity of the pitman 21, enters and passes through a ring 23 which surrounds a rod 24, carrying at its lower extremity, a dasher 25. This screw 22, serves at once as a means whereby the rod 24 may be removably assembled with the pitman 21, and as a means whereby the stroke of the dasher 25 within the cream receptacle 39 may be adjusted, it being obvious, that, by loosening the screw 22, the dasher 25 may be assembled with the pitman 21 in such a manner as to provide, between the dasher 25 and the bottom of the cream receptacle 39, such clearance as the operator may desire.

In order to confine the upper extremity of the rod 24, and to limit the same against undue lateral movement, the extension 38 of the cross-piece is notched as denoted by the numeral 26, and into this notch 26, the rod 24 is adapted to fit for reciprocation. The notch 26 is closed by means of a catch 27, one end of which is pivoted to the extension 38, upon one side of the notch 26 therein, the other end of said catch being notched to engage a pintle 28 projecting from the extension 38.

Passing now to a detailed description of the cream receptacle 39, it will be seen that the same includes an outer can 7. Mounted within this can 7, and co-axial therewith, is a tubular sleeve 29, open at its top and bottom, and provided adjacent its top, with apertures 30, other apertures 31, located adjacent the lower end of the sleeve 29 being provided. The exterior of the sleeve 29 is provided with longitudinally disposed ribs 32 which are substantially co-extensive in length with the sleeve itself, the said ribs, however, being extended, as denoted by the numeral 33, to project below the lower end of the sleeve 29. When the sleeve 29 is mounted in the can 7, these ribs 32 serve not only to space the sleeve 29 laterally, from the side walls of the can 7, but at the same time serve, to space the lower end of the sleeve 29 from the bottom of the can 7.

A closure 34 for the cream receptacle 39 is provided, and this closure 34 carries a depending flange 35 which is adapted to engage the can 7 at its upper extremity. The closure is further provided with a second depending flange 36, located within the flange 35 and concentric therewith, the last-named flange being adapted to fit within the upper end of the sleeve 29. The closure 34 is provided in its central portion, with a depending tubular collar 37 in which the rod 24 is adapted to reciprocate. The sleeve 29 is of somewhat less length than the can 7, and, although the closure 34 serves to stop the upper ends of both the can 7 and the sleeve 29, since the said sleeve is provided adjacent its top with the apertures 30, and adjacent its lower end, with the apertures 31, and further, since, by means of the extended portion 33 of the ribs 32, the lower end of the sleeve is spaced from the bottom of the can 7, it will be seen that the sleeve 29 has communication adjacent its top and adjacent its bottom, with the interior of the can 7.

In practical operation, the clamp formed by the arms 8, is tilted into a substantially horizontal position, and, the catch 27 being lifted, to open the notch 26 in the extension 38 of the cross-piece, the cream receptacle 39 is mounted in its place upon the base 1, the rod 24 being disposed in the notch 26. The catch 27 is then dropped to engage the pintle 28, and the arms 8 are uplifted, into a substantially vertical position, bringing the stop 11 above the top of the cream receptacle 39. The latches 12 are then caused to engage the pintles 15 which project from the standard 2, and, when the shaft 17 is rotated by means of the crank 18 on the pulley 19, the pitman 21, having been assembled with the rod 24 by means of the screw 22 and the ring 23, as hereinbefore described, will cause the dasher 25 to reciprocate in the sleeve 29.

The particular manner in which the reciprocation of this dasher 25 within the sleeve 29 operates to cause a circulation of cream within the cream receptacle 39 is noteworthy. The dasher 25 in its down-stroke, will cause the cream within the sleeve 29 to flow outward through the holes 31 in the bottom of the sleeve 29. The cream thus passing outward through the holes 30 will rise in the space between the sleeve 29 and the walls of the can 7, entering again the sleeve 29 by means of the apertures 30 adjacent the top thereof. Upon the up-stroke of the dasher 25, the cream will pass downward between the sleeve 29 and the wall of the can 7, a peculiar circulation thus being induced within the cream receptacle 39 tending in a remarkably short time to produce the formation of butter. It is obvious, that, since the lower extremity of the sleeve 29 is spaced from the bottom of the can 7, the circulation hereinbefore described, will take place, not only through the apertures 31 in the bottom of the sleeve 29, but, as well, between the lower extremity of the sleeve and the bottom of the can. By thus spacing the lower extremity of the sleeve from the bottom of the can, I obviate the possibility of the production of a vacuum within the device, during its operation, whereby the reciprocation of the dasher 25 might be rendered difficult.

The device, although simple in construction and of few parts, results in a churn adapted to produce butter in a short space of time, and, owing to the peculiar construction of the cream receptacle 39, whereby the aforementioned circulation is produced, a rapid movement of the dasher 25 is not necessary, and by this construction, the physical effort necessary to operate the device is reduced to a minimum. Moreover, since a rapid movement of the dasher 25 is not necessary, I am enabled to dispense with intermeshing pinions, and other devices of a like form, wherewith many of the reciprocating churns now upon the market are encumbered.

Having thus described my invention what I claim as new and desire to protect by Letters Patent is:

1. A device of the class described comprising a base; standards rising from the base; arms hinged at their lower ends to the base; a can located between the arms and the standards and arranged to be clamped therebetween; a stop uniting the upper extremities of the arms and arranged to extend over the can; means for locking the arms to the standards; a dasher to reciprocate in the can; and means carried by the standards for reciprocating the dasher.

2. A device of the class described comprising a base; standards rising from the base; a can mounted upon the base; a vertically swinging clamp hinged at its lower end to the base and arranged to coöperate with the standards in engaging the can; a dasher to reciprocate in the can; a rod rising from the dasher; means carried by the standards for reciprocating the dasher; a cap uniting the upper extremities of the standards and being apertured to receive the rod for reciprocation; and a catch assembled with the cap, and arranged to hold, removably, the rod within the aperture in the cap.

In testimony that I claim the foregoing as my own, I have hereto affixed my signature in the presence of two witnesses.

MARY V. DUDLEY.

Witnesses:
R. P. BERRY,
C. E. MARTIN.